United States Patent [19]

Flesher et al.

[11] Patent Number: 4,673,704

[45] Date of Patent: Jun. 16, 1987

[54] AQUEOUS POLYMER DISPERSIONS

[75] Inventors: Peter Flesher; David Farrar, both of West Yorkshire, United Kingdom

[73] Assignee: Allied Colloids Limited, United Kingdom

[21] Appl. No.: 749,295

[22] Filed: Jun. 27, 1985

[30] Foreign Application Priority Data

Jun. 28, 1984 [GB] United Kingdom ................ 8416453

[51] Int. Cl.$^4$ ............................................... C08L 1/02
[52] U.S. Cl. .................................... 524/519; 524/555; 524/557
[58] Field of Search .......................... 524/519, 555, 557

[56] References Cited

U.S. PATENT DOCUMENTS

| | | | |
|---|---|---|---|
| 3,839,307 | 10/1974 | Schmifg | 524/557 |
| 3,960,584 | 6/1976 | Savage | 106/178 |
| 4,012,352 | 3/1977 | Deyrup | 524/557 |
| 4,059,552 | 11/1977 | Zweigle | 524/555 |
| 4,362,841 | 12/1982 | Minatono | 524/801 |
| 4,380,600 | 4/1983 | Hosoda | 524/458 |
| 4,525,496 | 6/1985 | Adaway | 524/555 |
| 4,525,515 | 6/1985 | Peignier | 524/378 |
| 4,528,321 | 7/1985 | Allen | 524/801 |

OTHER PUBLICATIONS

U.S. patent application Ser. No. 749,294, filed Jun. 27, 1985, Title: Polymer Powders, Inventors: David Farrar et al.

*Primary Examiner*—Paul R. Michl
*Attorney, Agent, or Firm*—Jenner & Block

[57] ABSTRACT

A water miscible, stable, fluid product comprises particles above 20 microns in size of a high molecular weight polymer gel interconnected by a continuous phase that is an aqueous solution of an equilibrating agent that holds the water content of the particles in equilibrium with the water content of the aqueous phase and that prevents substantial agglomeration of the particles in the fluid product. Preferred equilibrating agents are sodium polyacrylate and poly-diallyl dimethyl ammonium chloride.

15 Claims, No Drawings

AQUEOUS POLYMER DISPERSIONS

High molecular weight water soluble polymers are useful in various applications, such as flocculation, for example waste water, or in paper making, thickening and coating applications. In most applications the polymer is used as a dilute aqueous solution at a concentration in the range 0.05 to 20% by weight. It is impractical to produce and transport such dilute solutions. Concentrated solutions are viscous and difficult to handle. Aqueous gels are also difficult to handle and to dilute and have low solids content compared to dry solids. Dry solids formed from aqueous gels require high energy expenditure in comminution and drying processes or use of undesirable inflammable solvents and may cause dusting problems.

Various methods for producing liquid products having a high concentration of polymers have been proposed. In U.S. Pat. No. 3,734,873 a water-in-oil emulsion containing aqueous polymer particles in a non-aqueous liquid including oil-in-water emulsifier is described. In GB No. 1,397,933 there is described a method of dispersing solid polymer into oil to give a fluid dispersion.

In U.S. Pat. No. 3,985,651 dry polymer is dispersed in a polyhydric alcohol in which it is not soluble. In U.S. Pat. No. 4,118,355, dry polymer is dispersed in one or a blend of water-miscible solvents (e.g., methanol and a glycol ether), in which it is insoluble but it dissolves in the presence of water.

Although these liquid products avoid many of the disadvantages of dilute solutions, gels and dry solids they incur the disadvantage that they include materials, for instance organic solvent and/or surfactant, that is generally unwanted at the place of use and may be positively undesirable. For instance the incorporation of oil or other organic solvents is undesirable when the products are being used in the solvent extraction of mineral values or in drilling muds for the oil industry and incorporation of surfactants is undesirable when the products are being used for the treatment of aqueous systems since the resultant water will contain surfactant and this may cause foaming or toxicity problems, especially when the water is eventually discharged into the environment. Also the use of organic solvents is expensive and can cause safety hazards during manufacture.

These liquid products often contain a stabiliser for stabilising the dispersion of polymer particles in the organic solvent. Stabilisers for polymer dispersions generally act by forming a protective film of water insoluble material around the polymer particles. Suitable materials are described in British Patent Specification No. 1,482,515. The continuous phase of the liquid products has to be non-aqueous since the polymer, being water swellable or water soluble, would otherwise dissolve partially or completely in the continuous phase and would form either a very viscous solution or an agglomerated mass.

In U.S. Pat. No. 4,380,600 a dispersion of certain water soluble polymers in aqueous media is made by polymerisation in the presence of certain, different, water soluble polymers, the amounts of water, monomer and polymer being within defined limits. The polymer is said to be present as microscopic particles and so presumably the particle size is at the most, only a few microns. It is essential to the process that the polymer made during the process is chemically different from the polymer in solution initially as stabiliser and this means that the process is only applicable to the production of products including chemically different polymer types. The polymer that was initially in solution may therefore be deterimental to the action of the polymer formed during the process or, at best, the polymer in solution may not contribute useful performance properties to the product even though it increases the weight of the product.

We have conducted experimentation in an attempt at modifying the process by the use of a dissolved polymer of the same chemical type as the polymer formed during the process and have confirmed that the polymerisation process is then inoperable and that, at best, a viscous solution is obtained. Accordingly the process described in U.S. Pat. No. 4,380,600 is of very limited applicability as regards the materials that it can form and use.

The production of a high molecular weight polymer having optimum performance characteristics necessitates very careful control of polymerisation conditions and extensive research has been conducted over the years into different types of polymerisation processes, for instance aqueous gel polymerisation and reverse phase bead, suspension or emulsion polymerisation. As a result of this research techniques have been perfected for manufacturing polymers having superior performance properties. The polymerisation process described in U.S. Pat. No. 4,380,600 is necessarily of an entirely new type and it would be unreasonable to expect to be able to perform it regularly in such a way as to obtain high molecular weight polymer having performance characteristics equivalent to those now regularly obtainable by well established commercial gel or reverse phase or other polymerisation processes. Accordingly the products of the process described in U.S. Pat. No. 4,380,600 could not be expected to have performance qualities equivalent to those that are obtainable by other techniques even if a solution had been found to the problem of incorporating a contaminating low molecular weight polymer with the high molecular weight polymer. It is significant that although the patent specification mentions the possibility of using a wide variety of stabilising polymers in practice all the examples except two stabilise the system using solely non-ionic polymer or a blend of non-ionic polymers, generally polyethylene glycol and/or polyvinyl alcohol. The exceptions are Example 5 where 5 grams of polyethylene imine are used with 20 grams of non-ionic polymer to stabilise 40 grams of a monomer mixture including cationic monomer, and Example 9 where 1 gram polysodium acrylate is used with 10 grams non-ionic polymer to stabilise 20 grams of monomer including cationic monomer.

Accordingly U.S. Pat. No. 4,380,600 does not contribute to a solution of the existing major problem of providing a high molecular weight water soluble polymer having optimum performance qualities in the form of a fluid product that is free of undesirable or unwanted contaminants.

In the invention a water miscible, stable fluid product comprises gel particles of high molecular weight water soluble polymer having a size of at least 20 microns and interconnected by a continuous phase that is an aqueous solution of an equilibrating agent that holds the water content of the particles in the fluid product in equilibrium with the water content of the aqueous phase and that prevents substantial agglomeration of the particles in the fluid product. The product is best made by dispersing into the aqueous medium polymer particles that may either be aqueous polymer particles having a size greater than 20 microns or dry polymer particles that will absorb water from the aqueous medium to form aqueous gel particles greater than 20 microns. In the prior art dispersions of water soluble polymers required the provision of a continuous oil phase interconnecting the paticles and a surfactant to assist in dispersion of the particles into the oil or a surfactant to assist in dispersion of the oil into the water in which the particles are subsequently used, or both. In the invention the need to use oil is avoided and the need to use the undesirable surfactants that were previously essential is also avoided. Instead the continuous, interconnecting, phase is merely an aqueous solution of an equilibrating agent which, as explained below, can be selected from a wide variety of materials so that, for any particular use, the composition can be formulated from materials that are acceptable and, in some instance, the equilibrating agent can be selected so as to improve the properties of the dispersed polymer.

The fluid product of the invention can be referred to as a dispersion but it should be understood that the particles are not generally held suspended in a continuous matrix of the aqueous phase but instead generally rest substantially in contact with one another but slide over one another. It appears that the aqueous phase provides a film around and between the particles to prevent them aggregating and to permit the composition to be fluid. Thus the product is stable in that upon static storage the particles remain substantially freely movable with respect to each other and if there is any tendency towards aggregation of particles this aggregation can easily be destroyed, and the fluidity of the product restored, by simple stirring or agitation. The product is water miscible in that the individual gel particles can easily be dispersed individually into water, and dissolve, upon simple addition of the fluid composition to the dilution water. Thus there can be little or no tendency for the individual particles to aggregate when the fluid product is added to dilution water.

As the product can be regarded as consisting primarily of particles resting substantially in movable contact with one another, rather than a dispersion of particles in excess continuous medium, the normal rules of increasing stability by reducing particle size may not apply. Instead of desiring the smallest possible particle size, as is required in conventional dispersions, in the invention it is preferred that the average particle size in the dispersion should be above 50 microns and preferably above 100 microns. Best results are generally obtained when the average particle size is in the range 200 microns to 2 mm, often 500 microns to 1 mm, but the particle size can be as large as, for instance, 3 or even 5 mm.

In U.S. Pat. No. 4,380,600 it is clear that the dispersion of microscopic particles is stabilised during the formation of the particles by polymerisation and it is also clear, as discussed above, that the mechanism is of very limited applicability as regards combinations of polymers. It is very surprising that in the invention it is possible to obtain a fluid stable composition from much larger particles and that the continuous phase for this should be an aqueous solution of an equilibrating agent that in practice is generally selected from materials entirely different from those specifically proposed in U.S. Pat. No. 4,380,600.

It is also very surprising that when dispersing a water soluble polymer in an aqueous phase it is possible to obtain a stable composition of the gel particles within the aqueous phase, without the aqueous phase dissolving the gel particles so as to form a sticky mass or homogeneous gel.

It is of course known that aqueous gel particles can be dispersed in oils or in hydrophilic liquids such as methanol or polyhydric alcohols. However all such materials incur disadvantages in the production or use of the compositions. Forming dispersions in, for instance, methanol necessitates handling large quantities of a highly flammable material. Forming dispersions in polyhydric alcohol necessitates handling difficulties and can result in cross linking or otherwise undesirable modification of the surface properties of many polymers. If the continuous phase is, initially, a substantially non-aqueous organic liquid it is inevitable that large amounts of this non-aqueous liquid have to be used and so can pollute water into which the compositions may eventually be discharged. As a result of using an aqueous solution as the continuous phase the amount of organic or other component in the continuous phase is reduced so that pollution problems are reduced and the toxicity, flammability and reactivity problems of, for instance, methanol and polyhydric alcohols are avoided.

One preferred way of making the products of the invention, and of carrying out the method of the invention, comprises adding substantially dry particles of the high molecular weight water soluble polymer to the aqueous solution of equilibrating agent, whereupon these particles will absorb water and become gel particles as a result of equilibration between the water content of the continuous phase and the water content of the gel particles (the two final water contents generally being different). The dry particles added in this manner will generally have a water content below 20%, typically 3 to 10%, and will generally have a particle size of from 10 microns to 2 mm, generally 100 microns to 1 mm. The dry particles swell as they absorb water and will generally have a final particle size in the fluid product of from 50 microns to 10 mm, generally 500 microns to 5 mm.

Alternatively the high molecular weight polymer can be introduced in the form of gel, for instance having a water content (based on water plus polymer) of at least 50% and generally 60 to 80%. The water content of the gel particles may be at a level such that there is substantially no transfer of water into or out of the particles when they are added to the aqueous solution or their water content may increase or decrease after addition, as a result of the transfer necessary to achieve equilibrium between the water contents of the aqueous solution and the gel particles. The gel may be added in the form of particles having the desired particle size (for instance a particle size of 500 microns to 5 mm) or may be added as larger pieces that must be comminuted after they have been added to the aqueous solution. The pieces may be blocks having a size of 500 mm or more and may be comminuted by being forced with the aqueous medium through an extruder and chopper, or may be granules, for instance fragments obtained by cutting a block of gel into pieces. The granules may have a particle size of, for instance, 3 to 200 mm or more, typically 5 to 100 mm. A blend of the granules and the medium may be milled by passage through any convenient apparatus for milling aqueous dispersions. A suitable apparatus is an in-line Silverson mixer, the milling may be effected in a single pass through the mixer or the blend may be passed through two or more mixers in series or through one mixer two or more times, the conditions being selected to give the desired final gel particle size.

Similarly, if the polymer is initially introduced substantially dry but with a particle size larger than is desired it is possible to mill, in the same manner, the fluid product existing after the polymer particles have become aqueous gel particles as a result of wholly or partially equilibrating with the aqueous phase.

The polymer that is added to the aqueous phase may have been formed by any convenient method capable of producing polymer having the desired performance characteristics and having particulate or other suitable physical form. For instance dry particles may have been made by reverse phase bead or other polymerisation processes followed by drying the resultant dispersion and separating the dry particles from the non-aqueous liquid or they may have been made by gel polymerisation followed by drying and comminuting the gel. Gel particles are generally fragments obtained by comminution of a mass of rigid aqueous gel, for instance as obtained by bulk aqueous gel polymerisation. This fragmentisation may be conducted in conventional manner, for instance by cutting a mass of gel into pieces and/or by extruding a mass of gel through coarse orifices, optionally cutting the gel before or after the extrusion. Other ways of making the starting polymer particles include precipitation polymerisation, emulsion or dispersion polymerisation with coagulation and optionally drying, and spray drying a polymer emulsion or dispersion.

Gel that is to be comminuted before or after contact with the aqueous medium must be sufficiently rigid that it can be comminuted into discrete particles without risk of these particles flowing into one another. Generally it has characteristics typical of gels that are air comminuted at present. Normally the viscosity of the gel is above 200,000 cps at 25° C.

The dry or gel polymer may consist only of the high molecular weight polymer and any water that is present or the polymer may be mixed with other components, for instance inorganic salts as described in European Patent Application No. 84302555.2.

The high molecular weight polymers are formed from water soluble monomers or water soluble blends of monomers by gel polymerisation or by any other convenient way of making soluble polymers. They normally have a molecular weight above 0.5 million, preferably above 1 million, for instance 5 to 30 million. They are useful as, for instance, viscosifiers and flocculants.

The equilibrating agent used in the invention acts by equilibrating the water content of the gel particles with the water content of the aqueous solution at a value such that the gel particles remain as separate particles and do not dissolve or agglomerate. In the absence of an appropriate amount of equilibrating agent the gel particles would absorb water from the aqueous solution to such an extent that they would either become so soft and sticky at their outer surfaces that they would agglomerate or they would fully dissolve. The equilibrating agent prevents the particles taking up this amount of water and instead holds the water content of the particles in equilibrium with the surrounding aqueous solution. If the particles are introduced having the equilibrium content then the equilibrating agent will prevent any substantial net transfer of water into or out of the particles, but in most instances the particles are introduced having a water content different from the desired final water content, in which event the equilibrating agent permits net transfer of water into or out of the particles until they achieve equilibrium, whereafter there is no further substantial net transfer of water into or out of the particles.

The choice of equilibrating agent is determined by the nature of the polymer. A phenomenon similar to osmosis may be utilised in the invention since if the ionic concentration in the aqueous medium is appropriate having regard to the ionic concentration of the gel granules or particles there may be little or no tendency for water to transfer from one phase to the other. However the polymer particles will have an inherent tendency to attract water, for instance by hydrogen bonding, irrespective of the ionic state and so the equilibrating agent may not be capable of being selected solely on the basis of conventional osmosis considerations.

For instance although it is known that certain inorganic salts can be used in high concentrations to dehydrate aqueous gels, in the invention it is generally found that the use of inorganic salts alone as the equilibrating agent is ineffective to prevent the polymer gel taking too much water from the aqueous medium. However some strongly ionic inorganic salts are sometimes usable alone with certain gel polymers, for instance ammonium sulphate is suitable as the equilibrating agent for a non-ionic polymer such as polyacrylamide.

Preferably the equilibrating agent comprises a water soluble polymer, sometimes in combination with a water soluble inorganic salt. This water soluble salt may be introduced as a component of the dispersed polymer particles, with consequential leaching from the particles into the aqueous medium, but often is deliberately added to the aqueous medium with the water soluble polymer, separate from the dispersed particles.

If the dispersed polymer is ionic the dissolved equilibrating agent preferably is co-ionic but in some instances may be counter-ionic, especially if inorganic salt is included in the equilibrating agent. The inclusion of inorganic salt is also useful as a way of reducing the amount of co-ionic polymer in solution that is required to give appropriate equilibration. Any salt or other equilibrating agent should be chemically inert during the process. For instance it should not undergo unwanted hydrolysis.

Generally non-ionic equilibrating agents are not very satisfactory for use with ionic polymers. If the high molecular weight polymer is non-ionic, especially polyacrylamide, cellulosic or starch polymers then the equilibrating agent can be selected from anionic, non-ionic and cationic materials.

In one preferred product the high molecular weight polymer is anionic and the equilibrating agent comprises dissolved anionic polymer or possibly cationic polymer or anionic surfactant.

In another preferred product the equilibrating agent is polydiallyl dimethyl ammonium chloride, the high molecular weight polymer preferably being cationic but also possibly being anionic or even non-ionic.

In another preferred product the equilibrating agent comprises a dissolved ionic polymer in an amount of at least 0.3 and generally at least 0.5 parts per part dry weight of the high molecular weight polymer.

In another preferred product the equilibrating agent comprises a dissolved polymer formed from at least one monomer that is the same as a monomer from which the high molecular weight polymer is formed, the equilibrating polymer and high molecular weight polymer preferably being homopolymers of the same monomer or copolymers formed from the same monomers, either in the same or different proportions.

In addition to selecting an appropriate material or mixture of materials for use as the equilibrating agent it is also necessary to select an amount of these materials to provide the desired effect. For instance if appropriate equilibration is obtained at one concentration of the chosen material or blend of materials it will be found that upon reducing this concentration sufficiently equilibration will be lost and a viscous solution or rubbery mass of gel particles will be obtained, instead of the desired discrete rigid gel particles.

The initial aqueous solution of equilibrating agent should have low viscosity and in particular will generally have a viscosity below 20,000 cps at 25° C., most preferably below 10,000 cps at 25° C., and so the equilibrating agent should not cause a substantial increase in the viscosity of the aqueous medium. Any polymer that is dissolved in the aqueous medium must therefore be of relatively low molecular weight, and will generally have a molecular weight below 500,000, often below 100,000, if cationic or non-ionic. Anionic dissolved polymers should normally have a molecular weight below 20,000 and preferably below 10,000, and most preferably below 5,000.

Suitable anionic gel polymers that can be utilised in the invention are water soluble or swellable salts of polymers of acrylic acid, methacrylic acid or acrylamido methyl propane sulphonic acid (AMPS), which is a U.S. registered trademark of the Tubrizol Corporation or other ethyleically unsaturated carboxylic or sulphonic acids optionally copolymerised with each other or with non-ionic ethylenically unsaturated, generally acrylic, monomers such as acrylamide. With such polymers the preferred equilibrating agents are water soluble anionic polymers, preferably homopolymers such as sodium acrylate or acrylamido methyl propane sulphonic acid (AMPS) sodium salt or other salts or other anionic monomer, and copolymers with monomers that do not render the polymer ineffective.

Particularly preferred novel products according to the invention are therefore the defined fluid products in which the gel polymer is one of the anionic polymers or copolymers discussed above and the equilibrating agent is a water soluble anionic polymer, preferably a polymer of sodium acrylate or AMPS sodium salt. Particularly preferred products are those in which the dispersed polymer is a sodium or other appropriate salt of acrylic acid, optionally copolymerised with acrylamide and the equilibrating agent comprises low molecular weight sodium acrylate, typically as an aqueous solution of 15 to 55%, preferably 30 to 45% by weight.

Instead of using the dissolved polymer alone, the required concentration can be reduced by the addition of inorganic salt such as sodium sulphate.

Some cationic polymers can be used as equilibrating agent for the dispersed anionic polymers, especially in the presence of an inorganic salt, for instance poly-diallyldimethyl ammonium chloride (poly-DADMAC), typically as an aqueous solution of 10 to 50%, preferably 15 to 30%, by weight, and polyvinyl pyridine salts. Non-ionic polymers are generally found to be ineffective with dispersed anionic polymers.

Suitable dispersed cationic polymers that can be used in the invention are polymers of DADMAC, vinyl pyridine methacrylamidopropyl trimethylammonium chloride (MAPTAC) and dimethylaminopropyl methacrylamide (DMAPMA) acid salts but, most preferably, are salts or quaternary salts of dialkylaminoalkyl-methacrylates, -acrylates or -acrylamides, optionally copolymerised with other acrylic or ethylenically unsaturated monomers, generally non-ionic monomers such as acrylamide. Suitable equilibrating agents for these cationic polymers include dissolved cationic polymers such as poly-DADMAC (this giving particularly valuable final products) or other quaternary polymeric salts, polyvinyl pyridine salts, polyethylene imines and certain anionic polymers, especially when mixed with salt. Non-ionic polymers are again generally unsatisfactory.

The preferred dispersed non-ionic polymer that is used in the invention is polyacrylamide but others that can be used include polyvinyl pyrrolidone, hydrolysed polyvinyl acetate and N-vinyl N-methyl acetamide or formamide. As equilibrating agents there are preferably used a variety of dissolved anionic polymers such as those discussed above, for instance sodium polyacrylate, or cationic polymers, for instance poly DADMAC. Some non-ionic polymers can be used in some instances, for instance polyethylene glycol (molecular weight preferably 10,000 to 30,000, preferably 20,000) and polyvinyl pyrrolidone. Generally there is no advantage in including an inorganic salt when stabilising a dispersed non-ionic polymer.

All synthetic polymers used in the invention are preferably formed from ethylenically unsaturated monomers, preferably acrylic.

The dispersed polymers can be natural or modified products, instead of the synthetic polymers discussed above. For instance they can be non-ionic or anionic and can be cellulose derivatives such as methyl cellulose or hydroxy ethyl cellulose or sodium carboxymethyl cellulose. Starch derivatives may be used, for instance a starch acrylamide and/or sodium acrylate product. For these products the preferred equilibrating agents are dissolved anionic polymers, particularly sodium acrylate.

Instead of using water soluble polymers as equilibrating agents it is also possible to use equivalent water soluble surfactants in similar amounts. Thus instead of using anionic polymer an anionic surfactant may be used, for instance a phosphate or sulphate of a long chain, generally linear, aliphatic alcohol, generally containing 8 to 22 carbon atoms. Instead of using a cationic polymer it is possible to use a cationic surfactant such as a quaternary ammonium compound. Suitable compounds that may be used include benzyl trimethyl ammonium chloride and compounds containing at least one, and generally at least two long chain aliphatic groups, for example di coco dimethyl ammonium chloride. Non-ionic surfactants that can be used include alkyl phenol ethylene oxide condensates such as nonyl phenol ethylene oxide condensate. All such surfactants are present in aqueous solution in relatively high concentrations, for instance above 10% and often above 20% by weight of the water plus surfactant.

Blends of polymers and/or surfactants may be used as equilibrating agent, any blend preferably being co-ionic. Thus a blend of anionic polymers or of cationic polymers or of non-ionic polymers may be used, but preferably not a blend of, for instance, non-ionic and cationic polymers.

If salt is used as part of the equilibrating agent the amount is generally from 0.3 to 5, most preferably 0.5 to 2, parts by weight per part by weight dissolved polymer. If the equilibrating agent can either be a dissolved polymer by itself or a blend of that dissolved polymer with salt the amount of salt used in the blend is generally from 1 to 3 parts, generally about 2 parts, by weight salt per part by weight of the dissolved polymer that is replaced by the salt. For instance if the equilibrating agent can conveniently be 100 grams dissolved polymer similar results may be obtainable with 50 grams dissolved polymer and 100 grams of the salt.

If inorganic salt is used it is usually an alkali metal or ammonium salt, often a sulphate or halide. The preferred material is sodium sulphate but others that may be used include ammonium sulphate and sodium chloride. In general any material that will ionise in the aqueous medium can be used provided it does not deleteriously affect the gel polymer or any solution polymer in the dispersion and provided it is commercially acceptable in the final product.

The concentration of dissolved equilibrating agent in the aqueous solution will generally be above 10% by weight but below 70% and usually below 60%. If used by itself the amount is generally at least 20%, and usually at least 30%, for instance up to 50%, by weight of the aqueous medium but if used as a blend with a salt it may be less, for instance at least 15% by weight of the medium. The amount of the salt, if present, is generally at least 5%, typically 15 to 30%, by weight of the medium. The ratio by dry weight of high molecular weight polymer to equilibrating agent is generally from 1:0.2 to 1:10, most preferably 1:0.3 to 1:4, these values being particularly applicable when the equilibrating agent consists of dissolved polymer. The amount is usually at least 0.5 parts. The amount of aqueous medium is usually at least 0.5, and generally at least one part by weight per part by weight of aqueous gel (i.e., based on the weight of polymer and water in gel particles) but is normally below 10 parts. Amounts of from 1.2 to 5, preferably around 2, parts by weight aqueous medium per part by weight aqueous gel are often preferred. Expressed alternatively, the amount of aqueous medium is generally 1.5 to 30, preferably 3.6 to 15, parts by weight per part dry weight of polymer in the gel.

The aqueous solution used for forming the fluid products of the invention should provide sufficient water to permit the dispersed particles to have the equilibrium water content but preferably does not provide a substantial excess of water over this. Generally the total amount of water (including both the water introduced in the aqueous solution and any water introduced in the polymer particles) is from 0.5 to 10, most preferably 0.9 to 5, parts water per part dry weight of dispersed polymer. If excess water is present the fluid product may separate into two layers, one layer being a fluid layer comprising the aqueous gel particles interconnected by the continuous phase and the other layer comprising aqueous solution of equilibrating agent.

Since water is generally transferred between the aqueous solution of equilibrating agent and the polymer particles it follows that the water content of the continuous phase that interconnects the particles may be different from the water content of the initial aqueous solution (unless the transfer of water is accompanied by a corresponding transfer of equilibrating agent into or onto the particles). It appears that the transfer of water, especially transfer into the particles, results in the accumulation of a concentration of equilibrating agent on or adjacent to the surfaces of the particles. The existence of this area of concentrated equilibrating agent may be important to success in the invention, for instance as a result of providing a lubricant film into which the gel polymer particles cannot dissolve but which prevents agglomeration and facilitates slippage of the adjacent particles over one another. This film may be a concentrated solution of the dissolved, water soluble, polymer or other equilibrating agent and so is entirely different from the water insoluble film that may enclose the individual particles of conventional dispersions of soluble polymer.

The dry weight of the dispersed particles in the fluid product conveniently is from 3 to 50% but most preferably is generally in the range 15 to 30%. The total dry weight of polymer in the product (i.e. the dry weight of dispersed polymer and any dissolved polymer that serves as equilibrating agent) is generally from 10 to 70% by weight, preferably 30 to 60% by weight.

The products of the invention are fluid products in that they flow readily upon their initial formation and that, upon storage, they either flow readily or can be made to flow merely by gentle stirring or other application of shear. The fluidity properties depend upon the combination of gel polymer, equilibrating agent, amounts of these and water, and particle size.

The invention provides, for the first time, the possibility of supplying water soluble particulate polymer of chosen performance characteristics in the form of a fluid product that does not contain substantial amounts of unwanted surfactant or unwanted non-aqueous phase. The invention also provides, for the first time, the opportunity of providing such a product free of unwanted or inert dissolved polymer and, in particular, of providing such a product having a substantial amount of a dissolved, generally low molecular weight, polymer in combination with dispersed, generally high molecular weight, polymer.

Processes in which mechanical or chemical operations are conducted on gel particles while present in an aqueous medium containing an equilibrating agent are described and claimed in an application filed even date herewith claiming priority from British patent application 8416454, reference 60/2294.

The following examples illustrate the invention. In the examples the proportions are by weight, unless otherwise stated, and I.V. stands for intrinsic viscosity.

EXAMPLE 1

40 g of a 40% aqueous solution of poly diallyldimethyl-ammonium chloride ($\overline{Mw}$ 72,000) was diluted with 40 g of water, as the aqueous solution of equilibrating agent.

20 g of a powdered copolymer of methyl chloride quaternized dimethylaminoethyl acrylate/acrylamide (40/60 w/w ratio—I.V. = 11.3 dl g$^{-1}$, 3M NaCl, 30° C.) was added to the solution with gentle agitation.

The resultant product was a fluid dispersion which remained stable over a 2 months' period.

The process of this example was repeated, with similar results, using the combinations of equilibrating agent and powdered polymer shown in Table 1. SA=sodium polyacrylate.

TABLE 1

| Equilibrating Agent | Powdered Polymer |
|---|---|
| 1 37.5 g 40% DADMAC Mw 72,000 15 g NaCl 42.5 g water | 20 g 34/66 SA/ACM (IV 17.0) |

TABLE 1-continued

| Equilibrating Agent | Powdered Polymer |
|---|---|
| 2  40 g, SA Mw 3,500, 15 g NaCl 40 g water | 20 g 40 QDMAEA.MECL/ 60 ACM (IV 11.0) |
| 3  100 g 30% ammonium polyacrylate Mw 3,500 | 30 g Natrosol 250 H |
| 4  100 g 20% SA Mw 3,500 | 20 g Methocel HB |

Natrosol is a registered trade mark of Dow Chemical Corporation for hydroxyethyl cellulose and Methocel is a registered trade mark of Hercules Powder Co. for methyl cellulose.

EXAMPLE 2

140 gms of pieces of a rigid aqueous gel copolymer of 16/84 w/w sodium polyacrylate/acrylamide (I.V.=15.0) having a polymer concentration of 33% was added to 125 gms solution of a homopolymer of sodium polyacrylate, Mw 3500 and the blend was milled using a 'Silverson' type mixer to produce a fine free flowing dispersion of gel particles. The product remained stable over a 2 months' period.

EXAMPLE 3

The process of Example 2 was repeated with a gel copolymer of 55% by weight sodium acrylate 45% acrylamide (IV 20, 33% solids gel) and aqueous media with the results shown in Table 2.

In this Table the following abbreviations are used
SA—sodium acrylate polymer
SMA—sodium methacrylate polymer
ACM—acrylamide polymer
PVP—polyvinyl pyrrolidone
PEG—polyethylene glycol
AMPS—sodium acrylamido-2-methyl propane sulphonic acid
PVA—polyvinyl alcohol
NVNMA—N-vinyl-N-methyl acetamide polymer
DADMAC—diallyl dimethyl ammonium chloride polymer
QDMAEMA—quaternised dimethylaminoethyl methacrylate polymer
MECl—methyl chloride
QDMAEA—quaternised dimethylaminoethyl acrylate polymer
DMS—dimethyl sulphate
SS—sodium sulphate The proportions of monomers used in the identified copolymers are by weight.

The following results were obtained. Samples 3, 4, 8, 10, 14 to 19 and 24 were unsatisfactory.

TABLE 2

| | AQUEOUS MEDIUM | OBSERVATION OF FLUID MILLED DISPERSION |
|---|---|---|
| 1 | 40% SA, Mw 3,500 | No swelling |
| 2 | 30% SA, Mw 3,500 | No swelling |
| 3 | 20% SA, Mw 3,500 | Some swelling |
| 4 | 10% SA, Mw 3,500 | Reject - rubbery gel |
| 5 | 20% SA, Mw 3,500 + 20% SS | No swelling, some crystals |
| 6 | 20% SA, Mw 3,500 + 10% SS | No swelling, some crystals |
| 7 | 15% SA, Mw 3,500 + 20% SS | No swelling, some crystals |
| 8 | 15% SA, Mw 3,500 + 15% SS | Reject - dissolves to form gel |
| 9 | 40% 20-isobutylmethacrylate/ 80-SA Mw 4,000 | No swelling |
| 10 | 30% PVP | Slight dissolution |
| 11 | 27% PEG, Mw 20,000 | No swelling |
| 12 | 40% 20-AMPS/80-SA, Mw 3,083 | No swelling |
| 13 | 40% 40-AMPS/60-SA, Mw 4,421 | No swelling |
| 14 | 40% ACM | Reject - dissolves |
| 15 | 40% 20-Methylacrylate/80-SA | Reject - dissolves |
| 16 | 25% PVA | Reject - dissolves |
| 17 | 25% PVA + 15% SS | Reject - PVA precipitates |
| 18 | 25% PVA + 15% PEG Mw 20,000 | Reject - dissolves to form gel |
| 19 | 30% NVNMA | Dissolves on prolonged standing |
| 20 | 40% SA, Mw 4,120 | No swelling |
| 21 | 40% SA, Mw 1,743 | No swelling |
| 22 | 40% 95 SA, 5 PEG, Mw 20,000 | No swelling |
| 23 | 40% 75 SA, 25 PEG, Mw 20,000 | No swelling |
| 24 | 40% 50 SA, 50 PEG, Mw 20,000 | Slight swelling |

EXAMPLE 4

The process of Example 2 was repeated but using various gel polymers and aqueous media with the results shown in Table 3. Samples 1, 8, 11, 12 were unsatisfactory.

TABLE 3

| | GEL POLYMER | AQUEOUS MEDIUM | OBSERVATION OF FLUID MILLED DISPERSION |
|---|---|---|---|
| 1 | SA (IV12) | 40% SA, Mw 3,500 | Gels on prolonged standing |
| 2 | SA (IV12) | 40% DADMAC, Mw 80,000 | No swelling |
| 3 | 50 AMPS-50 ACM (IV10) | 40% SA, Low Mw | No swelling |
| 4 | 50 SMA-50 ACM (IV6) | 40% SA, Low Mw | No swelling |
| 5 | 30.6% ACM (IV16) | 40% SA, Mw 3,500 | No swelling |
| 6 | 30.6% ACM (IV16) | 40% DADMAC, Mw 60,000 | No swelling |
| 7 | 30.6% ACM (IV16) | 40% PEG, Mw 20,000 | No swelling |
| 8 | 30.6% ACM (IV16) | 25% PVA | Swells on standing |
| 9 | 30.6% ACM (IV16) | 30% PVP | No swelling |
| 10 | 35% 53 QDMAEA MeCl/ 47 ACM (IV13) | 40% DADMAC, Mw 80,000 | No swelling |
| 11 | 35% 53 QDMAEA MeCl/ 47 ACM (IV13) | 30% QDMAEMA MeCl* | Slight swelling |
| 12 | 35% 53 QDMAEA MeCl/ 47 ACM (IV13) | 20% QDMAEA DMS* | Reject - dissolves |
| 13 | 32% 4 QDMAEA-MeCl/96 ACM (IV7) | 40% DADMAC | No swelling |
| 14 | 35% 20 DADMAC/ 80 ACM (IV8) | Aqueous Polyethyleneimine | No swelling |
| 15 | 50% QDMAEA MeCl (IV6) | Aqueous Polydimethylamine epichlorhydrin | No swelling |
| 16 | 35% 30 MAPTAC/ 70 ACM (IV8) | Aqueous DADMAC, Low Mw | No swelling |
| 17 | 35% 30 DMAPMA ½ H2SO4/ 70 ACM (IV6) | Aqueous DADMAC, Low Mw | No swelling |
| 18 | 25 SA 75 ACM | 60% 2-ethyl hexyl sulphate | No swelling |

*A 20% solution of these polymers had a viscosity of 5,000 CPS

Those dispersions shown in Examples 3 and 4 as not swelling thus provided fluid products according to the invention whilst those that were rejected gave products that were unsatisfactory either because of total solution of the gel polymer or because the gel swelled to such an extent that it agglomerated.

EXAMPLE 5

A commercially available sodium acrylate/acrylamide copolymer (34/66 w/w ratio I.V.=17.) was sieved into three particle size fractions. 50 g of each fraction was dispersed into 150 g of 26.6% aqueous solution of a homopolymer of sodium polyacrylate Mw 3,500, using a high speed stirrer. The viscosity of the resultant dispersions was measured immediately using a Brookfield viscometer at different spindle speeds. The results are shown in Table 4.

TABLE 4

| Particle size range | Viscosity (cPs) | | |
|---|---|---|---|
| | 1 r.p.m. | 10 r.p.m. | 100 r.p.m. |
| >250 <500 μm | 9,700 | 7,930 | 5,750 |
| >125 <250 μm | 18,800 | 12,200 | 7,140 |
| <125 μm | 150,600 | 45,500 | 18,200 |
| Unsieved material | 23,000 | 13,760 | 10,840 |

As the particle size reduces, so the dispersion viscosity increases. All products exhibited reduced viscosity with increasing shear. On standing the products formed light gels which rapidly thinned with mild agitation. Slight separation also occurred.

EXAMPLE 6

The method outlined in Example I was utilized except the low molecular weight polymer (continuous phase) was sodium polyacrylate Mw=3,500 (I) and the high molecular weight polymer (dispersed) was a copolymer of 34/66 w/w sodium polyacrylate/acrylamide (II) I.V.=17.0.

Various combinations of amounts were used with the results and the Brookfield viscosity at various spindle speeds of each resultant fluid product was recorded after 2 weeks.

TABLE 5

| g I (40% w/w) | g II (100%) | g H$_2$O | Viscosity CPS | | |
|---|---|---|---|---|---|
| | | | 1 r.p.m. | 10 r.p.m. | 100 r.p.m. |
| 70 | 50 | 80 | 14,000 | 880 | 156 |
| 80 | 50 | 70 | 12,000 | 1248 | 236 |
| 85 | 50 | 65 | 24,200 | 960 | 228 |
| 90 | 50 | 60 | 19,000 | 960 | 122 |
| 95 | 50 | 55 | 10,080 | 740 | 218 |
| 100 | 50 | 50 | 8,120 | 860 | 176 |
| 100 | 52.5 | 50 | 8,800 | 880 | 202 |
| 100 | 55.0 | 50 | 15,600 | 828 | 180 |
| 100 | 57.5 | 50 | 21,480 | 1120 | 224 |
| 100 | 60 | 50 | 25,000 | 1200 | 250 |
| 100 | 62.5 | 50 | 24,240 | 1012 | 234 |
| 100 | 65.0 | 50 | 19,200 | 1288 | 320 |

From this it will be seen that the products became viscous on standing, the viscosity depending upon proportions of the components, but that upon application of moderate shear they were all converted to low viscosity fluids.

EXAMPLE 7

3 polymer powders, A, B and C were used in this Example having the analysis

| DRY POWDER USED | | I.V. dl g$^{-1}$ |
|---|---|---|
| A | 60/40 w/w QDMAEA/Acm MeCl | 12.0 |
| B | 40/60 w/w QDMAEA/Acm MeCl | 11.3 |
| C | 27.6/72.2 w/w QDMAEA/Acm MeCl | 6.0 |

3 aqueous dispersions, A, B and C, were prepared, one from each of the polymers, by dispersing 20 g of the polymer into 80 g of a 20% solution of poly-DADMAC (Mw 72,000). All three dispersions were fluid dispersions of swollen gel particles.

Solutions of the powders A, B and C were formed in conventional manner. Solutions were also obtained of the corresponding polymers by mixing dispersions A, B or C with water. A solution of the poly-DADMAC was also obtained in conventional manner. The seven solutions were evaluated on a standard waste stock of 40 g newsprint, 10 g manilla and 5 g corrugated paper. This was disintegrated in 2 liter of water to give a standard waste stock of 2.5% consistency. The stock was diluted to 0.5% d/d solids and one liter aliquots dosed with either 200 g or 400 g ton$^{-1}$ d/d polymer.

The flocculated stock was transferred to a Schopper Reigler Freeness Tester whose back orifice had been blocked. The drainage rate was measured by timing the collection of 500 cm$^3$ water. The results are in Table 6.

TABLE 6

| PRODUCT | 200 g (secs) | 400 g (secs) |
|---|---|---|
| — | 99 | 99 |
| DADMAC homopolymer | 50 | 53 |
| Powder C | 47 | 30 |
| Powder B | 41 | 25 |
| Powder A | 48 | 26 |
| Dispersion C | 23 | 14 |
| Dispersion A | 29 | 18 |

This demonstrates that the DADMAC homopolymer is neither detrimental nor inert, as is the stabiliser used in each of the examples in U.S. Pat. No. 4,380,600, but is instead beneficial to the properties of the product.

EXAMPLE 8

A 35% by weight gel was formed of a polymer of 74.5% acrylamide and 23.5% by weight sodium acrylate, with 2% urea. The gel was put through a mixer and 1 part by weight of the gel was stirred with 2 parts by weight of an aqueous solution containing equilibrating agent and was allowed to stand. The solutions that were tested were:

(1) 70% w/w aqueous triethyl phosphate,
(2) 70% w/w aqueous phosphated 2-mole ethoxylated 2-ethyl hexanol,
(3) 54% w/w aqueous sodium 2-ethyl hexyl sulphate,
(4) 50% w/w aqueous solution of the sodium salts of sulphated methyl isobutyl carbanol and 2-ethyl hexanol.

In each test the particles did not cake and flowed easily over one another.

We claim:

1. A water miscible, stable, fluid product comprising aqueous gel particles of a high molecular weight water soluble polymer, said gel particles interconnected by a continuous liquid phase characterised in that the particles have a size of at least 20 microns and the continuous liquid phase is an aqueous solution of an equilibrating agent that holds the water content of the particles in the fluid product in equilibrium with the water content of the aqueous phase and that prevents substantial agglomeration of the particles in the fluid product and in which the gel polymer and equilibrating agent are selected from the combinations of gel polymer and equilibrating agent consisting of: (a) the gel polymer is an anionic polymer and the equilibrating agent is selected from the group consisting of water soluble anionic polymers of ethylenically unsaturated monomers, blends of water soluble cationic polymers of ethylenically unsaturated monomers with inorganic salts, and polydiallyldimethyl ammonium chloride; (b) the gel polymer is a cationic polymer and the equilibrating agent is selected from the group consisting of water soluble cationic polymers of ethylenically unsaturated monomers, polyethylene imine, dimethylamine-epichlorhydrin reaction product, and blends of water soluble anionic polymers of ethylenically unsaturated monomers with inorganic salts; (c) the gel polymer is a non-ionic polymer and the equilibrating agent is selected from the group consisting of water soluble anionic polymers of ethylenically unsaturated monomers and water soluble cationic polymers of ethylenically unsaturated monomers; and (d) the gel polymer is a cellulosic or starch polymer and the equilibrating agent is a water soluble anionic polymer of ethylenically unsaturated monomers; said fluid product made by dispersing into the aqueous solution particles of the polymer selected from the group consisting of aqueous gel polymer particles having the size of at least about 20 microns and dry particles that will absorb water from the aqueous solution to form aqueous gel particles having a size of at least 20 microns.

2. A product according to claim 1 in which the gel particles are between 100 microns and 2 mm in size.

3. A water miscible, stable, fluid product comprising aqueous gel particles of a high molecular weight water soluble ionic polymer, said particles interconnected by a continuous liquid phase, said gel particles having a size of at least 20 microns and the continuous liquid phase being an aqueous solution of an equilibrating agent that holds the water content of the particles in the fluid product in equilibrium with the water content of the aqueous phase and that prevents substantial agglomeration of the particles in the fluid product, said equilibrating agent comprising a dissolved ionic polymer in an amount of at least 0.5 parts per part by weight of the high molecular weight polymer and comprising also an inorganic salt when the dissolved ionic polymer is counterionic to the gel polymer, said fluid product made by dispersing into the aqueous solution particles of the polymer selected from the group consisting of aqueous gel polymer particles having the size of at least about 20 microns and dry polymer particles that will absorb water from the aqueous solution to form said aqueous gel particles having a size of at least 20 microns.

4. A product according to claim 3 in which the gel polymer is anionic and the equilibrating agent is a water soluble anionic polymer of ethylenically unsaturated monomers.

5. A product according to claim 3 in which the equilibrating agent is polydiallyl ammonium chloride and the gel polymer is cationic.

6. A product according to claim 3 in which the aqueous medium is a solution of 15 to 55% by weight sodium polyacrylate and the high molecular weight polymer is a polymer of sodium acrylate optionally copolymerised with one or more non-ionic or anionic monomers.

7. A product according to claim 3 in which the aqueous medium is a solution of 10 to 50% by weight diallyl dimethyl ammonium chloride and the high molecular weight polymer is selected from polymers and copolymers of dialkyl amino alkyl acrylates and methacrylates or acid addition or quaternary ammonium salts thereof.

8. A product according to claim 1 in which the concentration of equilibrating agent in the aqueous solution is 10 to 70% by weight, the ratio dry weight of gel polymer to equilibrating agent is from 0.2:1 to 1:10, the product includes 0.5 to 10 parts by weight aqueous solution of equilibrating agent per part by weight of aqueous gel particles and the equilibrating agent is selected from water soluble polymers.

9. The product of claim 3 wherein the gel particles are between 100 microns to 2 millimeters.

10. A product according to claim 1 in which the gel polymer is anionic and the equilibrating agent is present in an amount of at least 0.3 parts per part by weight of the gel polymer and is selected from water soluble anionic polymers of ethylenically unsaturated monomers.

11. A product according to claim 1 in which the gel polymer is selected from the group consisting of polyacrylamide, cellulosic and starch polymers and the equilibrating agent is a water soluble anionic polymer of ethylenically unsaturated monomers and the amount of equilibrating agent is at least 0.3 parts per part dry weight of the gel polymer.

12. A product according to claim 1 in which the gel polymer is an anionic polymer of ethylenically unsaturated monomers comprising sodium acrylate and the equilibrating agent is selected from the group consisting of water soluble sodium polyacrylate having molecular weight below 10,000 and blends of 1 part polydiallyldimethyl ammonium chloride with 0.3 to 5 parts inorganic salt.

13. A product according to claim 1 in which the gel polymer is a cationic polymer of ethylenically unsaturated monomers and the equilibrating agent is selected from the group consisting of water soluble polydiallyldimethyl ammonium chloride, quaternised dialkylaminoalkyl(meth)acrylate and polyethylene imine.

14. A product according to claim 1 in which the amount of water is from 0.5 to 10 parts water per part dry weight gel polymer, the ratio of dry weight gel polymer to equilibrating agent is 1:0.2 to 1:10 and the total amount of dissolved and dispersed polymer in the product is from 10 to 70% by weight.

15. A product according to claim 1 in which the total amount of water in the product is 0.9 to 5 parts per part dry weight gel polymer, the ratio by weight gel polymer to equilibrating agent is 1:0.3 to 1:4 and the total weight of gel polymer and dissolved polymer is 30 to 60% by weight of the product.

* * * * *